UNITED STATES PATENT OFFICE.

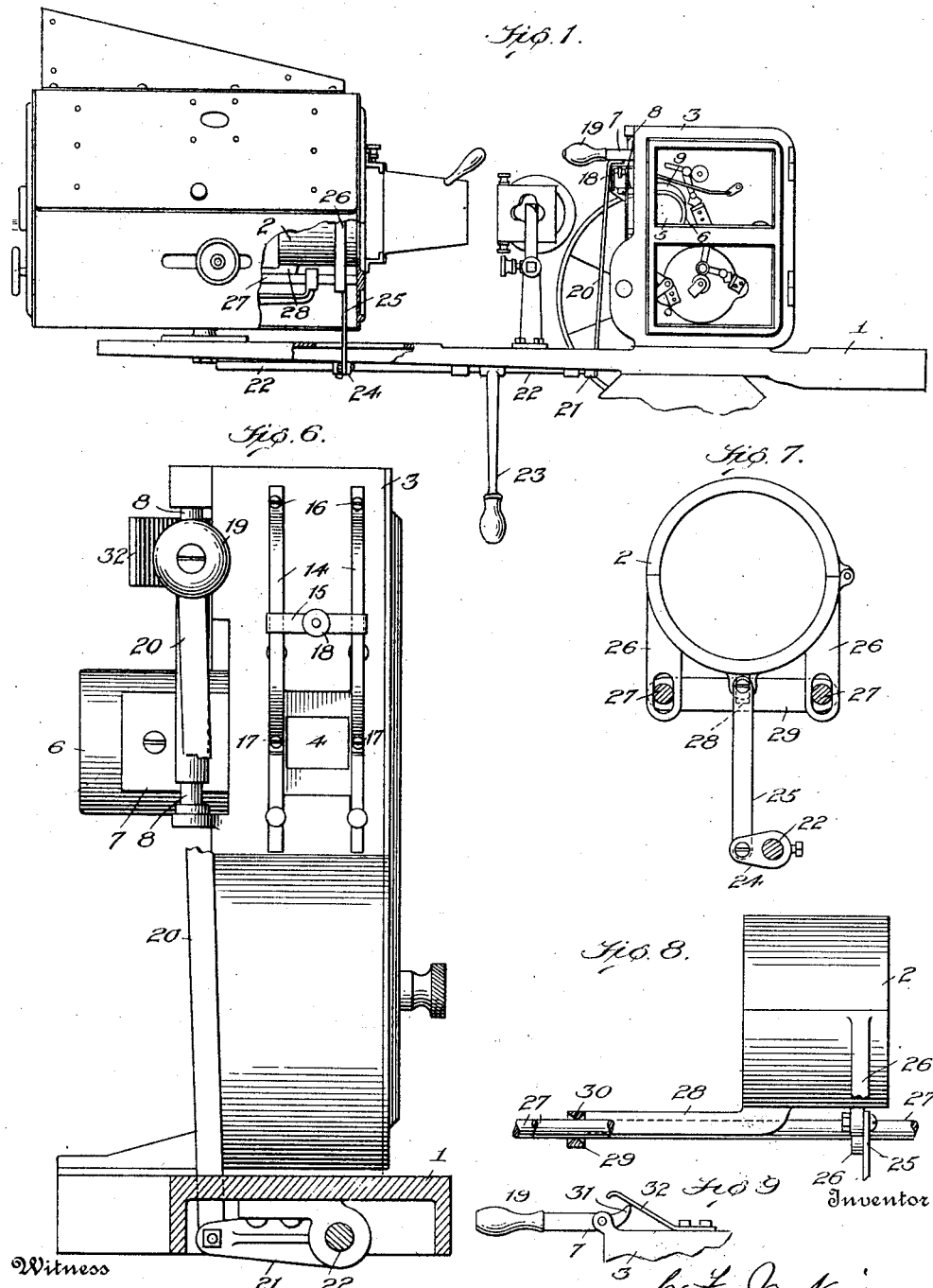

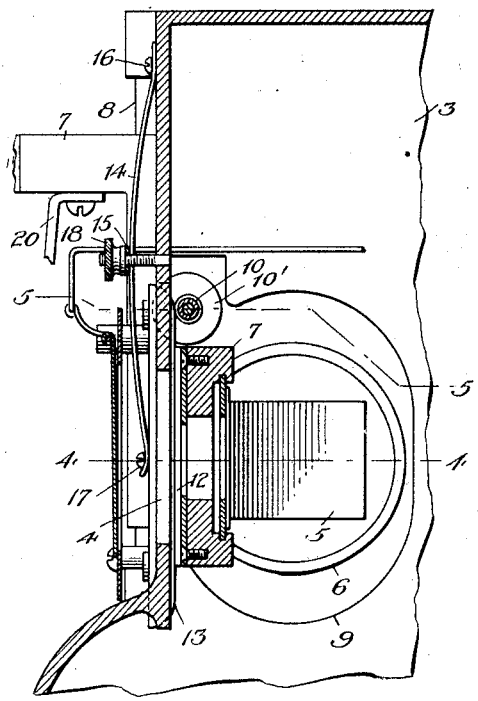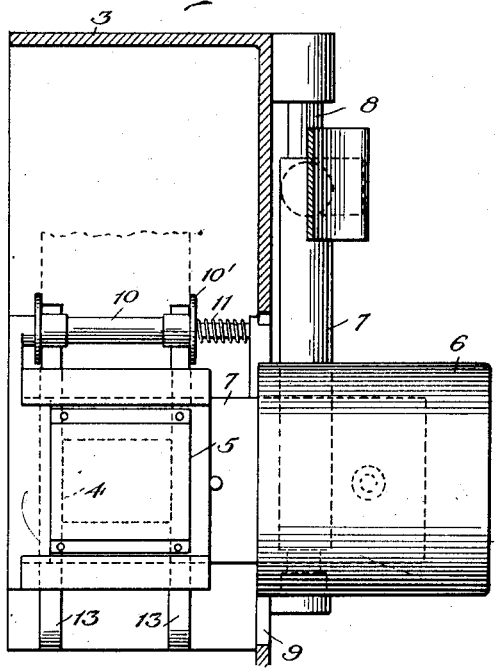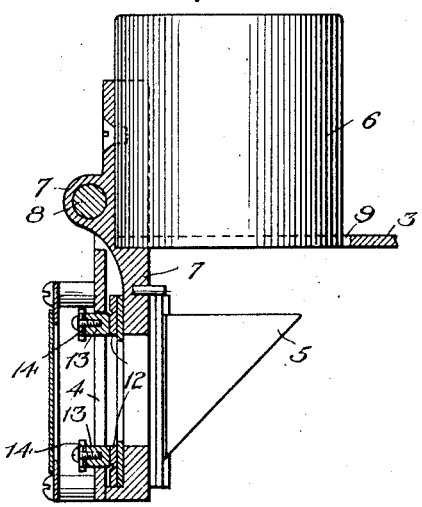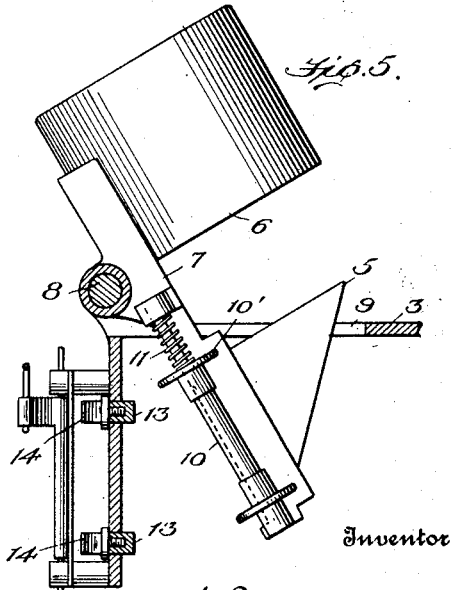

CHARLES FRANCIS JENKINS, OF WASHINGTON, DISTRICT OF COLUMBIA, ASSIGNOR TO THE GRAPHOSCOPE COMPANY, OF WASHINGTON, DISTRICT OF COLUMBIA, A CORPORATION OF DELAWARE.

MOTION-PICTURE MACHINE.

1,342,681. Specification of Letters Patent. Patented June 8, 1920.

Application filed October 17, 1916. Serial No. 126,067.

*To all whom it may concern:*

Be it known that I, CHARLES FRANCIS JENKINS, a citizen of the United States, and resident of Washington, in the District of Columbia, have invented certain new and useful Improvements in Motion-Picture Machines, of which the following is a specification, reference being had therein to the accompanying drawing.

In motion picture machines it is desirable to be able to frame the picture quickly and accurately, to guide the film properly at the exposure point and to adjust the lens accurately whatever the other adjustments that are made, and further do this simply and conveniently even when the beam is deflected from its initial direction to a screen.

To attain these ends is an object of this invention.

In the accompanying drawings,

Figure 1 shows in side elevation a part of a machine provided with my devices.

Fig. 2 is a vertical section through the exposure spring in the casing which incloses a part of the film operating devices.

Fig. 3 is a sectional view looking from the right in Fig. 2.

Fig. 4 is a section on the line 4—4, Fig. 2.

Fig. 5 is a section on the line 5—5, Fig. 2.

Fig. 6 is a view looking from the left in Fig. 2.

Fig. 7 shows the condensing lens, looking from the right in Fig. 1.

Fig. 8 is a view looking from the left in Fig. 7.

Fig. 9 is a plan view of parts seen also in the upper right hand portion of Fig. 1.

In these views, 1 represents the frame of the machine, 2 the condensing lens, 3 the casing of the film exposing devices, and 4 the exposure opening in said casing. The projecting beam entering the opening and passing through the film is deflected at right angles by a prism or mirror 5 and passes from the casing through a projecting lens 6 to a screen, not shown, parallel to the axis of the machine. The prism and projecting lens are mounted on a rigid frame 7 which both rotates and slides on a vertical post 8 outside the casing and the lens normally lies in an opening 9, in the casing, large enough to permit these movements.

The film in its course to the exposure point passes around a flanged roller 10 mounted on the frame 7 above the exposure point, and having one sliding flange 10' which is normally urged toward its inner limit by a very light spring 11. The film then passes downward over the opening between a plane frame 12 and parallel rigidly connected vertical shoes 13 which are pressed toward the sides of said plane frame by springs 14 connected by a cross-bar 15 and fixed to the casing at their upper ends 16.

Their lower ends are fixed to the shoes at 17, and their tension adjusted by a screw device 18. The frame 7, prism 5, lens 6, spool 10, and frame 12 move together, the frame sliding on the post 8 in framing, or being swung about the post from the position of Fig. 4 to the position of Fig. 5 by means of a handle 19 so that the film may be conveniently put in position preparatory to operating the machine. The frame 7 may be thus raised by means of a bar 20 loosely pivoted to a horizontal part of the frame 7 and actuated by a crank 21 upon a horizontal shaft 22 mounted on the main frame below the casing and itself rotated by a handle 23. This shaft also bears a shorter crank 24 adjustable along the shaft to allow focusing the condensing lens 2, which is also arranged for swinging in a vertical plane, and the shorter crank is connected to the lens structure by a link or pitman 25. The lens casing 2 to which the link 25 is attached has arms 26 which are slotted for adjusting vertically on fixed guide rods 27 which fit the slots laterally, and also has a rearwardly extending arm 28 secured to a crosshead 29 pivoted at 30 to the rods upon which it slides. The shorter crank 24 being loosened on the shaft 22 the lens may be adjusted axially at will, and the parts are so proportioned that vertically adjusting the frame 7 by rotating the shaft 22 correspondingly adjusts the condensing lens so that the axis of the beam is made to pass along the axis of the projecting lens 6 whatever the position of this lens and its frame. The frame 7 is provided with a projection 31 of curved wedge form which is constantly pressed by a flat spring 32 on the casing 3, the spring holding the frame firmly in either the position of Fig. 4 or that of Fig. 5, when it has been swung to either position by means of the handle 19 and further serving to hold the frame, frictionally, at any point in its vertical path without interfering with its swinging movement.

What I claim is:

1. The combination with a casing having a film exposing opening, of an exterior source of light, a condensing lens arranged to direct a beam from said source through said opening and the film thereat, a member carrying a projecting lens and one element of a film guiding and pressing device and pivoted to swing toward and from the film, means for vertically adjusting said member, means for manually swinging said member, whatever its vertical adjustment, and automatic means for securely holding said member at either limit of its angular movement.

2. The combination with a plate having an exposure opening, of vertically adjustable beam projecting devices alongside the plane of said plate, a source of light, a condensing lens for directing through said opening a beam from said source, means for vertically adjusting said projecting devices manually, and means whereby such adjustment automatically moves the condensing lens in the same direction through a corresponding shorter distance, preserving substantially exact alinement.

3. The combination with a projecting lens, of a source of light, a condensing lens for directing a light beam from said source to the projecting lens, means for independently adjusting the condensing lens along its axial line, means for vertically adjusting the projecting lens, and means whereby the latter adjustment automatically adjusts the condensing lens in the same direction, whatever its adjusted position with respect to the projecting lens, to preserve its substantially perfect alinement.

4. The combination with a casing and a source of light therein, of a condensing lens mounted in the casing to slide parallel to the optical axis and to swing vertically, a casing having a member provided with a film exposing opening and a projecting lens, approximately in the line of said axis, and a manually operable means for vertically adjusting said member and simultaneously swinging the lens first mentioned to preserve alinement.

5. The combination with a horizontal frame bearing a casing containing a source of light and a condensing lens mounted for horizontal and vertically swinging adjustment, of film exposing and beam projecting devices mounted on said frame in position for receiving a beam from the condensing lens, and a manually operable rock shaft connected by unequal cranks with the condensing lens and said devices, respectively; whereby the light source being fixed the condensing lens may be focused and the two lenses and the exposure aperture may be kept in exact alinement.

In testimony whereof I hereunto affix my signature.

CHARLES FRANCIS JENKINS.